United States Patent
Weber

(10) Patent No.: US 7,427,103 B2
(45) Date of Patent: Sep. 23, 2008

(54) REMOVABLE BOLSTER FOR ISOFIX

(75) Inventor: James L. Weber, West Bloomfield, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 0 days.

(21) Appl. No.: 10/593,210

(22) PCT Filed: Mar. 17, 2005

(86) PCT No.: PCT/CA2005/000402

§ 371 (c)(1),
(2), (4) Date: Sep. 15, 2006

(87) PCT Pub. No.: WO2005/087535

PCT Pub. Date: Sep. 22, 2005

(65) Prior Publication Data

US 2007/0176476 A1    Aug. 2, 2007

(51) Int. Cl.
*B60N 2/28*    (2006.01)
(52) U.S. Cl. ............... 297/228.13; 297/188.2; 297/219.1; 297/253; 297/463.2; 297/481
(58) Field of Classification Search ............. 297/188.2, 297/219.1, 226, 253, 411.24, 481, 228.13, 297/250.1, 463.1, 463.2
See application file for complete search history.

(56) References Cited

U.S. PATENT DOCUMENTS

| | | | |
|---|---|---|---|
| 6,254,183 B1 | 7/2001 | Bian et al. | |
| 6,279,798 B1 * | 8/2001 | Partch et al. | 224/275 |
| 6,478,376 B2 * | 11/2002 | Hayashi et al. | 297/250.1 |
| 6,601,917 B1 * | 8/2003 | Christopherson | 297/253 |
| 6,681,969 B1 * | 1/2004 | Giedeman et al. | 224/275 |
| 7,093,896 B2 * | 8/2006 | Morita | 297/253 |
| 2002/0149243 A1 * | 10/2002 | Galbreath | 297/253 |

FOREIGN PATENT DOCUMENTS

| | | |
|---|---|---|
| DE | 296 12 441 U1 | 10/1996 |
| EP | 1 099 602 A1 | 5/2001 |
| JP | 2001-122004 | 5/2001 |
| JP | 2001-270359 | 10/2001 |

OTHER PUBLICATIONS

English Abstract of JP 2001-122004.
English Abstract of JP 2001-270359.
International Search Report & Written Opinion for PCT/CA2005/000402 dated May 17, 2005.

* cited by examiner

*Primary Examiner*—Peter R. Brown
(74) *Attorney, Agent, or Firm*—Clark Hill PLC

(57) ABSTRACT

A seat assembly for a motor vehicle includes a frame that is fixedly secured to the motor vehicle. A seat cushion is secured to the frame. The seat cushion defines a seat width. A seatback is secured to the frame and is pivotal with respect to the seat cushion. A loop fastener is fixedly secured to the frame and extends between the seat cushion and the seatback. The loop fastener selectively receives a child seat latch therethrough to secure a child seat to the seat assembly. The seat assembly also includes a removable bolster that is selectively securable to the loop fastener. The removable bolster covers the loop fastener when the child seat is removed from the seat assembly. Therefore, the occupants of the seat assembly will contact the removable bolster and be prevented from feeling the loop fastener when sitting on the seat assembly.

9 Claims, 3 Drawing Sheets

REMOVABLE BOLSTER FOR ISOFIX

BACKGROUND OF THE INVENTION

1. Field of the Invention

The invention relates to a seating assembly for a motor vehicle. More particularly, the invention relates to a seat assembly having a removable bolster used to cover loop fasteners of a child seat restraint system to provide comfort to the occupant of the seat assembly.

2. Description of the Related Art

In an attempt to standardize the securing of a child seat to a seat assembly for a motor vehicle, seat assemblies have been modified to accomplish this means. In particular, a loop fastener is secured to a frame of the seat assembly between the seat cushion and the seat back. These loop fasteners are typically referred to as ISOFIX steel bars. A latch extending out from the bottom of the child seat engages the loop fastener to provide a positive attachment of the child seat to the seat assembly.

The problem with the loop fasteners extending out between the seat cushion and the seat back is that larger children and adults will feel the loop fastener, especially when the seat back of the seat assembly is in a reclined position. The loop fasteners are visible and detract from the aesthetic appearance of the seat assembly. This aesthetic appearance deteriorates as the paint on the loop fasteners chips away through use of the child seat. Additionally, the trim and upholstery of the seat cushion and seat back near the loop fasteners may be damaged by repeated securing and removing of the child seat from the seat assembly. This is because the latches extending out from the bottom of the child seat will scratch the upholstery. Leather is most vulnerable to damage by the process of securing the child seat to the loop fasteners of the seat assembly.

SUMMARY OF THE INVENTION

According to one aspect of the invention there is provided a removable seat bolster for covering a loop fastener of a seat assembly. The removable seat bolster includes an inner body defining a snap port for receiving a portion of the loop fastener therein. The removable seat bolster also includes a cover that is fixedly secured to the inner body. A plush is fixedly secured to the cover to match the removable bolster to the seat assembly.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
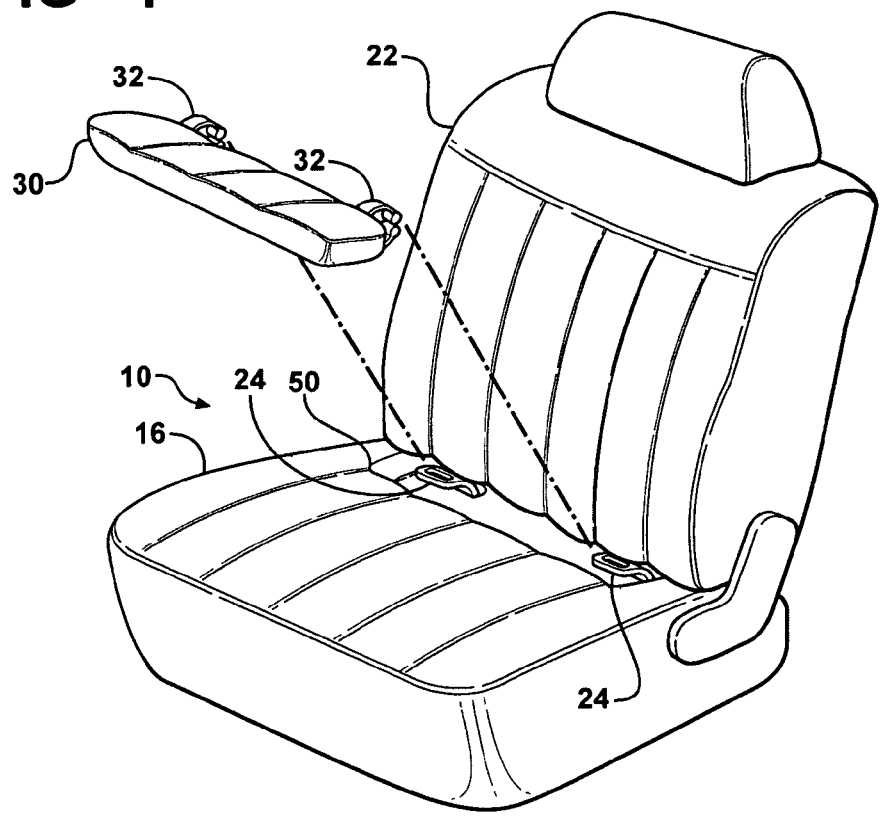
FIG. 1 is an exploded, perspective view of one embodiment of the invention and a seat assembly.
Figure 2:
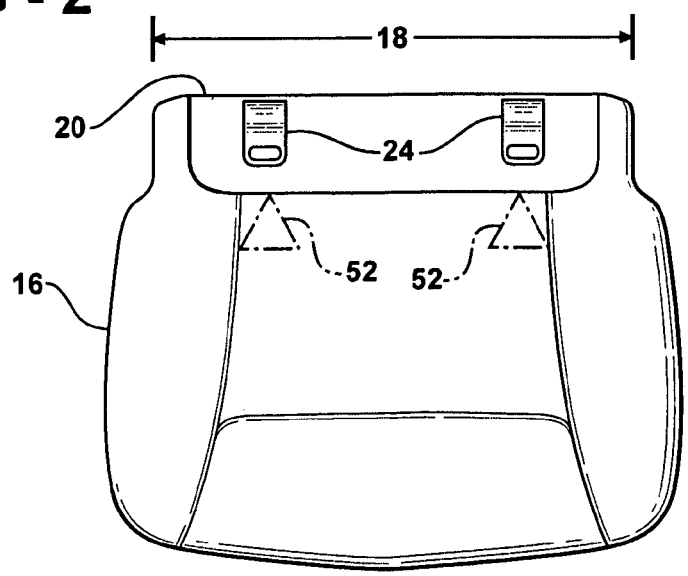
FIG. 2 is a plan view of a seat cushion.
Figure 3:
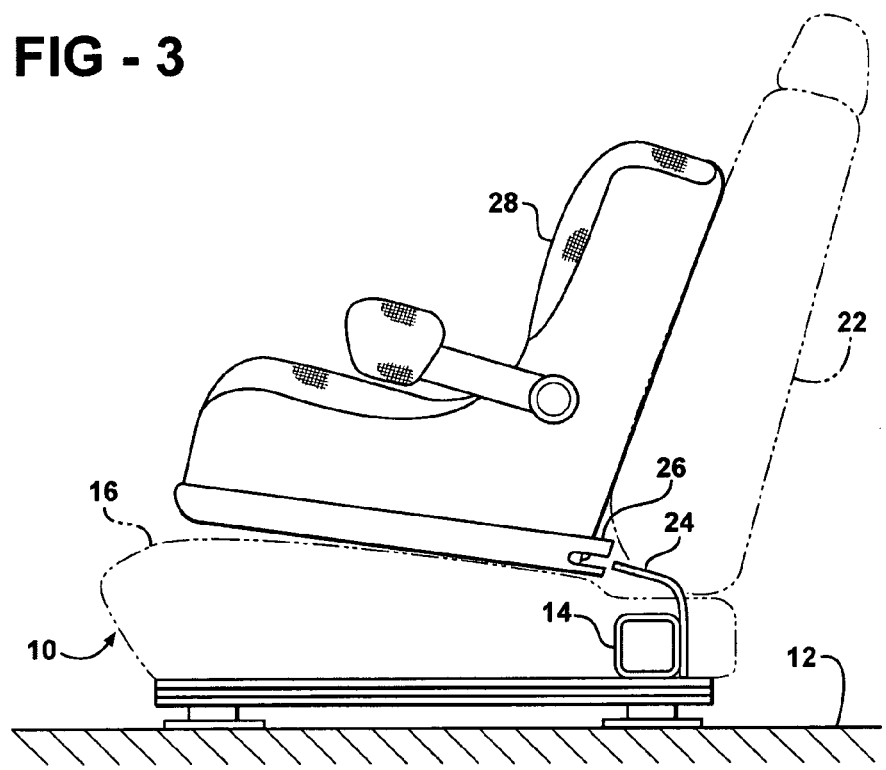
FIG. 3 is a side view of a seat assembly with a child seat positioned for attachment thereto.

Referring to FIGS. 1 through 3, a seat assembly, generally indicated at 10, is shown fixedly secured to a floor 12 of a motor vehicle. A frame 14 is used to secure the seat assembly 10 to the floor 12. The frame 14 is shown schematically and without detail as any frame 14 may be used with the invention. A seat cushion 16 is secured to the frame 14. Referring to FIG. 2, the seat cushion 16 has a defined seat width 18 along a backside 20 of the seat cushion 16.

A seat back 22 is secured to the frame 14 adjacent the backside 20 of the seat cushion 16. The seat back 22 is pivotal with respect to the seat cushion 16.

A loop fastener 24 is also fixedly secured to the frame 14. The loop fastener 24 extends between the seat cushion 16 and the seat back 22. The loop fastener is typically referred to as an ISOFIX steel bar. The seat assembly 10 may include more than one loop fastener 24 per seat. The loop fastener 24 selectively receives a latch 26 of a child seat 28. The latch 26 extends through the loop fastener 24 to secure the child seat 28 to the seat assembly 10, as is best shown in FIG. 3.

The seat assembly 10 also includes a removable bolster 30. The removable bolster 30 is selectively secured to the loop fastener 24 to cover the loop fastener 24 when the child seat 28 is removed from the seat assembly 10 such that occupants of the seat assembly 10 will contact the removable bolster 30 and be prevented from feeling the loop fastener 24 when sitting on the seat cushion 16.

Figure 5:
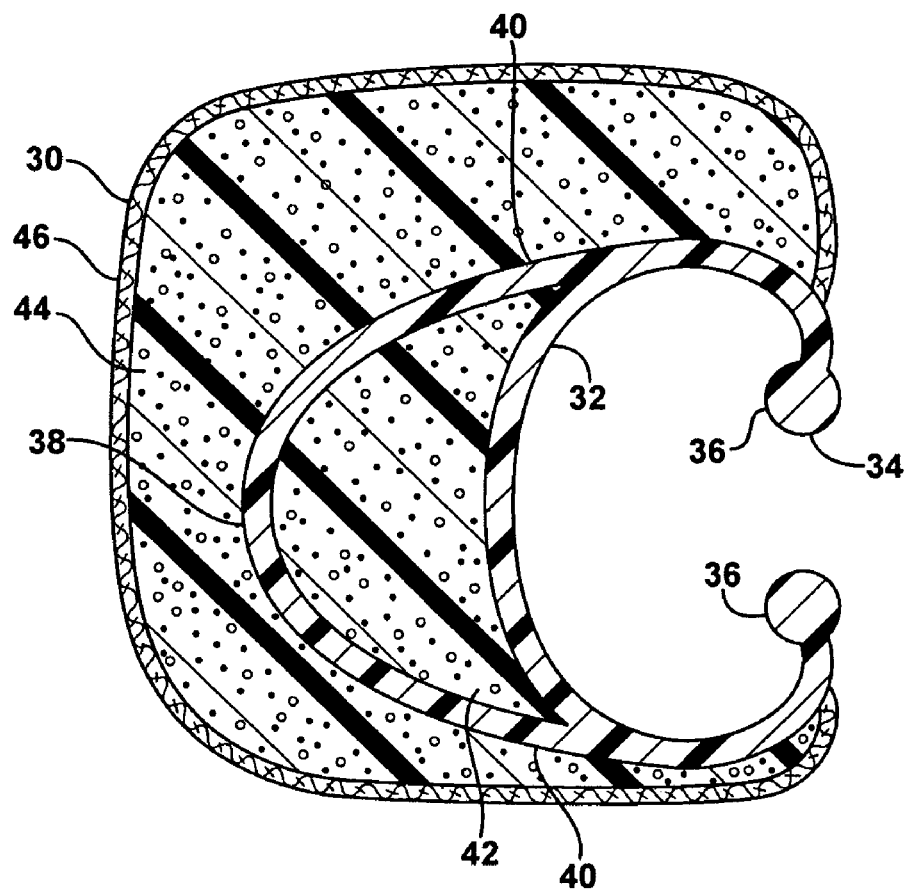
FIG. 5 is a cross-sectional side view of a removable bolster according to the invention.

Referring to FIG. 5, a side view of the removable bolster 30 is shown. The removable side bolster 30 includes an inner body 32. The inner body 32 is C-shaped in cross-section and extends along a predetermined length. In one embodiment, the predetermined length of the inner body 32 and, hence, the removable bolster 30 is equal to the defined seat width 18 of the seat cushion 16. In other embodiments, the removable seat bolster 30 and inner body 32 extend along a portion of the defined seat width 18. In this alternative embodiment shown in FIG. 1, the removable bolster 30 would extend along a length suitable to cover all of the loop fasteners 24 of the seat assembly 10.

The inner body 32 of the removable bolster 30 includes a snap port 34 that is reinforced with widened bulbous ends 36. The widened ends 36 add strength to the snap port 34. The snap port 34 defines an opening that is smaller than the width of the loop fastener 24. Therefore, the inner body 32 is slightly deformed when it is being forced over the loop fastener 24. This allows the snap port 34 and the removable bolster 30 to create a snap fit therebetween.

The removable bolster 30 also includes a cover 38. The cover 38 is fixedly secured to the inner body 32. The cover 38 is also C-shaped, wherein ends 40 of the cover 38 are fixedly secured to the inner body 32. The cover 38 defines an interior space 42. In one embodiment, this interior space 42 is empty. The cover 38 is fabricated from a flexible material allowing it to be deformed and compress, redefining the interior space 42 when an occupant sits on the seat assembly 10. The cover 38 is resiliently deformable allowing the hollow interior space 42 to return to its steady state condition after the occupant leaves the seat assembly 10.

A plush 44 is fixedly secured to the cover 38 and extends thereabout. The plush 44 is a thick covering of the cover 38. It is contemplated that the plush 44 will have an outer surface, or trim cover, 46 that includes the same material that is used on at least a portion of the seat assembly 10 allowing the removable bolster 30 to match the appearance and aesthetics of the seat assembly 10. The thickness of the plush 44 is created by a foam layer. It should be appreciated by those skilled in the art that the foam layer may be fabricated from materials other than foam allowing the cover 38 and plush 44 to combine to give the feel that the removable bolster 30 has a cushioning effect.

To further facilitate the preservation of the seat assembly 10, a first embodiment of the invention, shown in FIG. 1, includes a recess 50 in the seat cushion 16. The recess 50 allows the latch 26 of the child seat 28 to engage the loop fastener 24 without having to press down against the seat cushion 16. The recess 50 is designed so that it will receive the removable bolster 30 therein to facilitate as much of an uninterrupted profile of this seat cushion 16 as possible.

Figure 4:
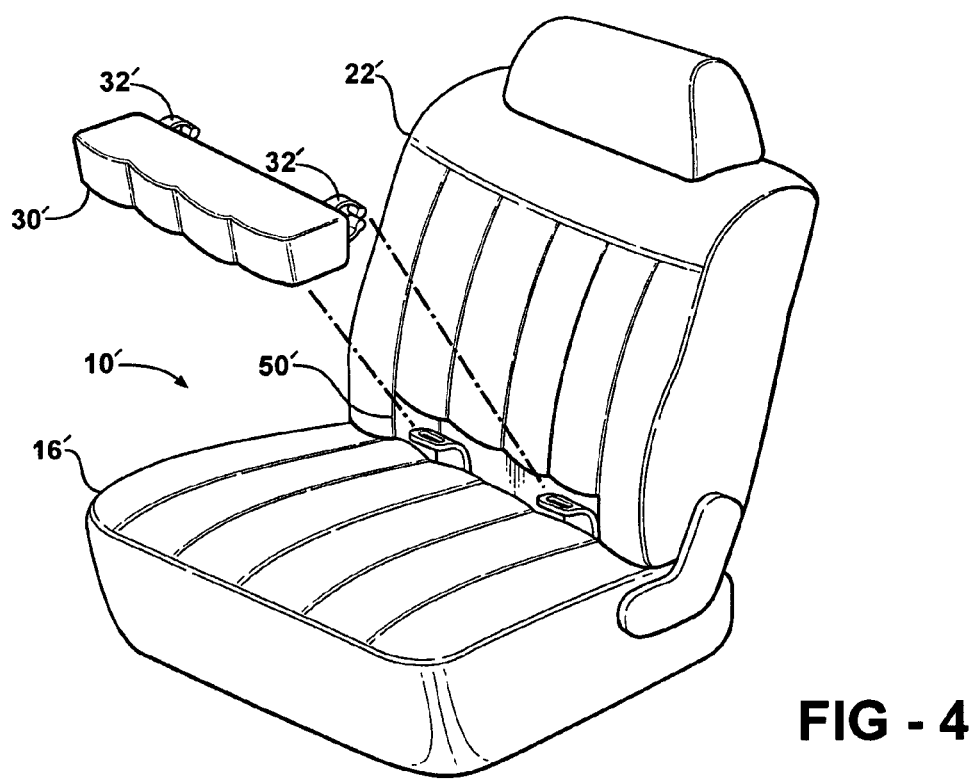
FIG. 4 is an exploded, perspective view of a second embodiment of the invention and a seat assembly.

In an alternative embodiment, shown in FIG. 4, wherein like prime numerals represent similar elements as those in the first embodiment, the recess 50' is cut out of the seat back 22' and not the seat cushion 16'. This allows the loop fastener 24' to extend further up and away from the frame 14' to facilitate ease of securing the child seat 28 to the seat assembly 10'.

Returning attention to FIG. 2, indicators 52 may be affixed to the seat cushion 16. The indicators 52 would indicate the location of the loop fastener(s) 24 that are incorporated into the seat assembly 10. The indicators could be affixed to the seat cushion 16 or could be designed into the seat cushion 16 such that the indicators 52 would be an integral part of the design of the seat cushion 16.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A seat assembly for use in a motor vehicle, said seat assembly comprising:
   a frame fixedly secured to the motor vehicle;
   a seat cushion secured to said frame, said seat cushion defining a seat width;
   a seat back secured to said frame;
   a loop fastener fixedly secured to said frame and extending between said seat cushion and said seat back, said loop fastener adapted to selectively receive a child seat latch therethrough to secure a child seat to said seat assembly; and
   a removable bolster including an inner body extending between opposing spaced apart bulbous ends and defining a snap port therebetween for receiving a portion of said loop fastener therein for selectively securing said removable bolster to said loop fastener, said removable bolster further including a flexible cover secured to said inner body, wherein said removable bolster covers said loop fastener when the child seat is removed from said seat assembly such that occupants of said seat assembly will contact said removable bolster and be prevented from feeling said loop fastener when sitting on said seat assembly.

2. A seat assembly as set forth in claim 1, wherein said cover includes plush fixedly secured thereto and encased in a trim cover extending about said inner body and said cover.

3. A seat assembly as set forth in claim 2, wherein said cover defines an interior space between said cover and said inner body to enhance flexibility in said cover.

4. A seat assembly as set forth in claim 3, wherein said cover is fixedly secured to said snap port.

5. A seat assembly as set forth in claim 4, wherein said seat cushion includes a recess to receive said removable bolster therein.

6. A seat assembly as set forth in claim 5, wherein said removable bolster extends through a length equal to said seat width.

7. A seat assembly as set forth in claim 4, wherein said seat back includes a recess to receive said bolster therein.

8. A seat assembly as set forth in claim 7, wherein said removable bolster extends through a length equal to said seat width.

9. A seat assembly as set forth in claim 1, wherein said seat cushion has a recess and said removable bolster is received in said recess.

* * * * *